P. LANHAM.
RECORDING METER.
APPLICATION FILED NOV. 16, 1912.

1,075,427.

Patented Oct. 14, 1913.

2 SHEETS—SHEET 1.

Witnesses
A. W. Edelin.
V. J. Houghton.

Inventor
Paul Lanham
by Pennie Goldsborough & Whale
attys

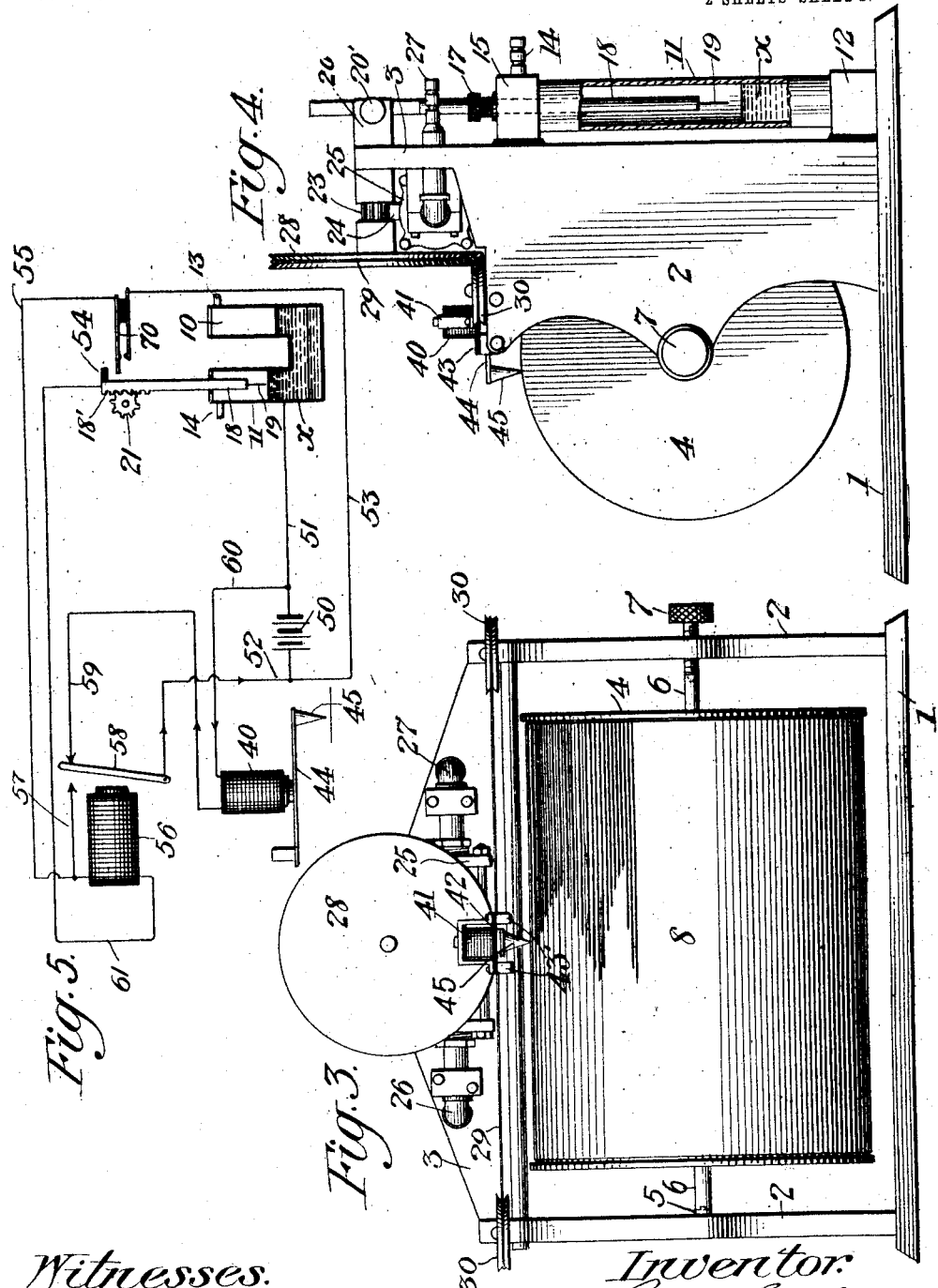

UNITED STATES PATENT OFFICE.

PAUL LANHAM, OF LANHAM, MARYLAND.

RECORDING-METER.

1,075,427. Specification of Letters Patent. Patented Oct. 14, 1913.

Application filed November 16, 1912. Serial No. 731,768.

*To all whom it may concern:*

Be it known that I, PAUL LANHAM, a citizen of the United States, residing at Lanham, county of Prince George, State of Maryland, have invented certain new and useful Improvements in Recording-Meters; and I do hereby declare the following to be a full, clear, and exact description of the invention, such as will enable others skilled in the art to which it appertains to make and use the same.

The invention has for its object to provide a simple, durable and highly efficient metering and recording apparatus, for indicating and recording the conditions of pressure and flow of fluids, and more particularly changes in such conditions, such as variations in pressure, changes in velocity in fluid media, and changes in temperature, so that the indications made upon a permanent record sheet by the apparatus will show all variations, however small, in the conditions from instant to instant.

In its broad aspect, the invention is applicable to any measuring instrument involving the use of a manometer, thermometer, or similar apparatus employing a column of mercury or other conductive fluid, which is responsive to changes in the pressure, flow, velocity, temperature, or other physical condition which it is desired to determine.

Figure 1:
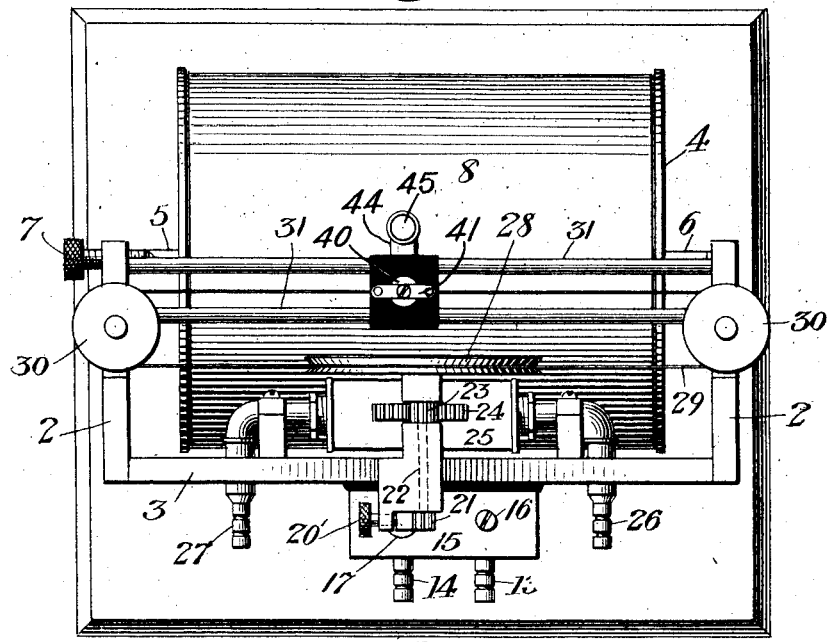
Figure 2:
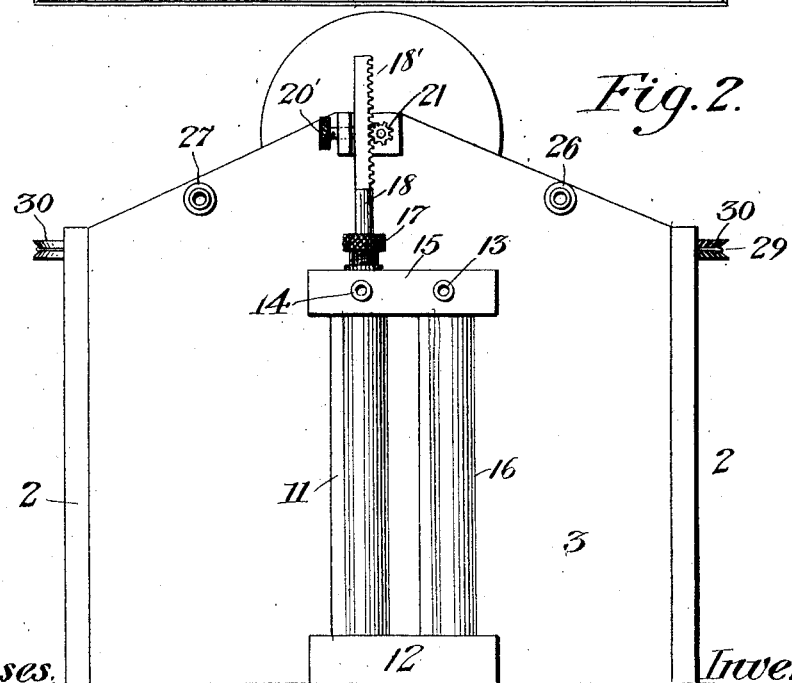

A practical exemplification of the invention as applied to a fluid meter for indicating and recording the flow and changes of velocity of fluids is illustrated in the accompanying drawings, in which, Figure 1 is a plan view of the apparatus. Fig. 2 is a rear elevation of the same. Fig. 3 is a front elevation thereof. Fig. 4 is a side elevation, and Fig. 5 is a diagram illustrating the apparatus and the electrical circuits by means of which the recording operations are effected.

Referring to the drawings, numeral 1 indicates a base having secured thereto side standards 2, 2 and a back-board 3. Mounted in the standard 2 for rotary movement about the stationary shaft 6 is a rotating recorder drum 4 which is given a regular rotation by clockwork or similar driving mechanism, the said driving mechanism effecting a single rotation of the drum during a specified interval of time, viz., once every twenty-four hours. In order to admit of the ready removal of the drum for the application of the usual form of record sheet 8 which surrounds the drum, one end of the shaft 6 is notched to form locking engagement with a lug 5 secured to one standard 2, while the other end of the shaft is countersunk to receive the conical end of adjusting screw 7, which serves the purpose of centering the shaft and the drum and holding the parts accurately in desired position. By backing off the screw 7 the drum and its shaft may be lifted out of the supporting framework, the sheet of paper or the like removed therefrom, and a new sheet supplied thereto, after which the drum is again placed in position in the frame. Coöperating with the recorder drum is a suitable marking device which is reciprocated in a fixed path parallel with the axis of the drum adjacent the record sheet carried by the drum, as will be hereinafter more fully explained.

Mounted on the base 1 and attached to the rear face of the backboard 3 is a U-tube consisting of a hollow base 12, two legs 10 and 11, preferably of glass, and a cap piece 15. Within said U-tube is contained a body of mercury $x$ which fills the hollow base portion 12 and extends up into the legs 10 and 11 for a certain distance. The cap 15 is provided with an intake nipple 13 which communicates with the interior of leg 10 and a nipple 14 communicating with the leg 11. The nipples 13 and 14 are adapted to be connected by relatively small tubes to the Pitot tube or pressure tubes of the Venturi meter, which latter are in turn connected to a main or conduit through which the flow to be measured passes, in the manner common to devices of this general character and as will be well understood by those skilled in the art. The cap 15 is likewise provided with a filling opening 16 provided with a suitable airtight closure to admit of the mercury being renewed or replenished when necessary.

Mounted in the cap 15 in alinement with the leg 11 of the U-tube is an insulating stuffing box 17 through which passes a rod 18 provided at its lower end with a sharp pointed wire 19 of platinum or the like, adapted to make electrical contact with the mercury in the U-tube. The upper end of the rod 18 is preferably square in cross section and is provided on one lateral face with a rack 18', which is engaged by a pinion 21, the rotation of which causes a reciprocation of the bar 18 within the leg 11 of the U-tube. Said rod 18 with its associated platinum wire end constitutes the movable contact coöperating with the mercury in the tube which primarily controls the operation and actuation of the recording mechanism. The rack portion of the rod is held in proper working engagement with the pinion 21 by means of a set screw 20' carried by a bracket 20 attached to the backboard 3 of the apparatus. Pinion 21 is secured to a shaft 22 journaled in the bracket 20, and to the other end of said shaft is secured a pinion 23 meshing with a rack 24 which is secured to the moving member of a small reciprocating water motor 25 mounted on the front face of the backboard and provided with hose connecting nipples 26 and 27 by means of which the fluid pressure for operating the motor is supplied to and exhausted from said motor. The motor may be operated either by hydraulic or pneumatic pressure, as may be found more convenient, and in fact, may be replaced by any suitable type of motor for effecting a regular alternate rotation or oscillation of shaft 22 to impart a regular and uniform reciprocation of movable contact rod 18.

Mounted on the end of shaft 22 is a relatively large pulley 28 having a grooved peripheral edge over which runs a wire or other driving band 29 which is given one complete turn about said pulley 28 and extends in opposite directions over guide pulleys 30, 30 journaled on the upper edges of the standards 2.

Secured to the driving band or wire 29 and sliding upon fixed guide rods 31, 31, is a small carriage carrying the marking device coöperating with the record sheet on the recorder drum, so arranged that, as the driving band or wire 29 is moved backward and forward by the oscillation of the pulley 28, the marking device is caused to reciprocate along guide rods 31 through a predetermined path of movement over the surface of the record sheet on the drum and parallel with the axis of said drum. The marking device consists of a small conical reservoir 45 containing ink or the like, having a minute perforation at its lower end sufficient to allow the ink to flow therefrom by attrition when said reservoir 45 engages at its perforated end with the sheet of paper, but it will prevent any flow of the ink when the reservoir or pen is lifted from the paper. Said reservoir or pen 45 is attached to the movable armature 44 of an electro-magnet 40, which is mounted upon an insulating base 43 provided with suitable runners 43' engaging the guide rods 31, said magnet being secured to the base 43 by means of a strap or yoke 41.

From the foregoing description, it will be apparent that when the apparatus is in operation the motor 25 will impart a regular reciprocation to the bar 18 constituting the movable contact coöperating with the mercury column in the leg 11 of the U-tube and will also impart a synchronous reciprocation of the marking device with respect to the record sheet carried by the drum 4, which in turn is given a uniform rotation by its clock-work or other suitable driving means, so that if the marking device were permitted to remain in contact with the paper on the drum, it would produce a regular series of spaced substantially parallel lines or ordinates practically perpendicular to the lateral edges of the record sheet.

In order to render the markings or indications on the record sheet accurately indicative of the flow or change of velocity of the fluid to be measured, the following electrical accessories are provided. A common electric battery 50 is provided to supply the energy for actuating the several electrical controlling devices, which in the present instance comprise the electro-magnet 40 controlling the marking device and a relay 56 which controls and regulates the operation of the magnet 40. The circuit of the electro-magnet 40 from the battery 50 is normally closed by the armature 58 of the relay 56 by way of the following:—battery 50, wire 60 through magnet 40, wire 59, armature 58, wire 52, back to the battery. When the platinum wire on the end of rod 18 engages the surface of the mercury, a circuit through the relay 56 from the battery 50 is closed at one point and the said circuit through the relay is completed after the rod 18 is moved downward for a predetermined distance, preferably to the end of its downward stroke, at a normally open contact 70, which is adapted to be engaged and closed by an insulated abutment 54 carried by the upper end of the rod 18, the complete circuit through the relay being as follows:—from battery 50, wire 51, mercury $x$, contact point 19, the rod 18, wire 61, through relay 56 wire 55, contact 70, wire 53, back to the battery. The passage of the current through relay 56 causes the armature 58 thereof to be attracted, thereby breaking the circuit to the marker magnet 40 and permitting its armature to fall, thereby bringing pen 45 into contact with the record sheet on the drum. As soon as this circuit has been completed and the relay 56 energized, an auxiliary circuit is closed to retain the relay energized while the contact wire 19 of rod 18 remains in the mercury and until the extreme point of the wire 19 emerges from the mercury and breaks the circuit at the surface of the mercury. This auxiliary circuit is as follows: from battery 50, wire 51, mercury $x$, contact wire 19, rod 18, wire 61, through the relay, wire 57, through relay armature 58, wire 52, back to the battery. During the upward movement of the rod 18, before the wire 19 has emerged from the mercury, the abutment 54 disengages the upper member of contact 70 which immediately assumes its normally open condition. Under these circumstances, it will be apparent that so long as the end of the wire 19 carried by rod 18 is out of contact with the mercury in the U-tube, the relay circuit is broken in two points, the relay deënergized and its armature is retracted to close the circuit from the battery 50 through the magnet 40 which holds the pen 45 away from the surface of the paper on the recorder drum. As soon as the relay 56 is energized, however, by the closing of its circuit, first by the immersion of the wire 19 in the mercury $x$, and second, by the closing of the normally open contact 70, the circuit to magnet 40 is broken at relay armature 58 and is maintained broken until the instant of the emersion of the extreme point of the wire 19 from the mercury, and during this period of time, the pen 45 will be in contact with the record sheet on the drum 4 and will be moved across the record sheet, leaving thereon a definite indication in the form of a clear line or ordinate substantially normal to the lateral edges of the record sheet. This operation is repeated for each reciprocation of the rod 18 and the marking pen 45, the length of each line or ordinate marked by the pen on the record sheet depending upon the height of the mercury in leg 11 of the U-tube and therefore upon the duration of the contact between the mercury and the wire 19, the termination of the mark or indication being effected by the emersion of the wire 19 from the column of mercury which effects a sharp instantaneous break of the relay circuit with a consequent instantaneous closure of the magnet circuit 40 and a retraction of the pen 45 from the paper.

Inasmuch as the height of the mercury in the leg 11 varies with the rate of flow to be measured, it will be apparent that the ordinates marked by the pen 45 on the record sheet will vary in length exactly in proportion to the variations in the rate of flow to be measured. When there is no flow through the conduit, the pressures exerted through the respective tubes connected to nipples 13 and 14 will be the same and the mercury in the two legs 10 and 11 will be at the same level, which level will be above that reached by the lowest point in the travel of the platinum wire 19 carried by rod 18, so that the circuit to the relay 56 will be closed and an operation of the pen mechanism obtained thereby plotting a line on the chart, the upper termination of which will determine the zero for the chart. Any flow through the circuit causes the mercury to rise in leg 11, so that the wire 19 will engage and penetrate the body of mercury a distance exactly equal to the rise in height of the latter plus the distance which the wire 19 plunges below the surface of the mercury when the latter is at its zero or lowest position, and this contact of the wire 19 with the mercury column, together with the closure of the normally open contact 70, will close the circuit of the relay and cause the pen 45 to mark a line or ordinate on the record sheet, the period of closure of the relay circuit being exactly commensurate with the travel of the wire 19 during the interval between the closing of the normally open contact 70 and the emersion of the end of wire 19 from the mercury column. This will result in a series of parallel ordinates starting from a given base line or datum line determined by the time of closure of contact 70, relative to the reciprocation of rod 18 and pen 45, and terminating the instant the end of wire 19 leaves the mercury. The termination of each ordinate, therefore, indicates the rate of flow of the fluid to be measured at a given instant and the variations in the lengths of the ordinates, or the terminations of the respective ordinates will indicate the variations in the flow from instant to instant, so that there will be shown on the recorder sheet a series of parallel ordinates, the outer ends or terminations of which define the exact variations in the rate of flow in the conduit.

An essential advantage of this arrangement and mode of operation resides in the fact that the effective indication on the record sheet, to wit, the termination of the successive ordinates is produced by the instantaneous breaking of the circuit of the relay 56 and the instantaneous energization of the magnet 40 when and at the instant the fine point of platinum wire 19 breaks contact with the surface of the mercury $x$. By making the effective indication dependent upon the breaking of the circuit between the sharp end of the wire 19 and the mercury it is found possible to record differences in flow which could not be noted by any other practical form of recording mechanism. Furthermore, by making the indications of the variations in the form of relatively dark and sharply defined ordinates, closely spaced, a clear, legible and permanent record may be effected.

The closure of the normally open contact 70 may be effected at appropriate intervals by any of the moving parts of the apparatus, and it is not essential that such a closure be made by the rod 18. It is desirable, however, that the said contact 70 be closed for an instant during some portion of the upward stroke of the rod 18 varying from the extreme lower limit of the stroke to just before the emersion of the wire 19 from the mercury, so that the corresponding movement of the recorder pen 45 may produce markings in the form of ordinates on the record sheet starting from a fixed base line, which is determined by the closing of the contact 70 resulting in the energization of relay 56 and the deënergization of magnet 40.

As indicated, the apparatus although simple in construction and practically immune to derangement, is exceptionally delicate and accurate in its results, giving a clear indication and record of very slight differences in the rate of flow which it is desired to measure.

Although the invention has been described with reference to a fluid meter for indicating the flow and changes of velocity of flowing fluids, it will be understood that it is not limited to such use, but is applicable to the accurate measuring and recording of other conditions and changes of condition of physical matter, which is capable of being indicated primarily by variations in the conducting column of a manometer tube, thermometer, or similar apparatus, such as is commonly employed for indicating changes in velocity of fluids, changes in pressure of liquid or gaseous media, and changes in temperature.

What I claim is:—

1. A meter comprising a recorder, a fluid column variable with the force to be measured, a contact positively movable into and out of said fluid column, and electrical mechanism controlled by the movement of withdrawal of said contact in the fluid column for operating said recorder.

2. A meter comprising a recorder including a moving record sheet and a marking device reciprocating across said sheet, a column of liquid variable with the variations in the force to be measured, a contact movable into and out of said liquid column in synchronism with said marking device, and electrical mechanism controlled by the movement of said contact for operating said marking device.

3. A meter comprising a recorder including a moving record sheet and a marking device reciprocating across said sheet, a column of liquid variable with the variations in the force to be measured, a contact movable periodically into and out of said liquid column, and electrical means operable during the movement of the contact from a point of immersion below the surface of the liquid column and the point of emersion of said contact for effecting an actuation of said recorder.

4. A meter comprising an electrically conductive column of liquid variable with the variations in the force to be measured, a recorder, an electric circuit including the liquid column controlling the recorder, and a contact in said circuit positively movable into and out of said liquid column and operable upon leaving the liquid in said column to actuate the recorder.

5. A meter comprising an electrically conductive column of liquid variable with the variations in the force to be measured, a recorder, an electric circuit normally retracting the record making element of the recorder, a second circuit including the liquid column, a contact in said second circuit movable into and out of said liquid column and operable upon leaving the liquid in said column to actuate the recorder.

6. A meter comprising a recorder including a moving record sheet and a marking device moving across said sheet, a column of liquid variable with the variations in the force to be measured, a contact movable into and out of said liquid column, means for moving said contact and said marking device in substantial synchronism, a circuit operating said marking device, a relay circuit including the liquid column and the movable contact controlling the operating circuit of the marking device, a normally open contact in said relay circuit, and means actuated by a moving part of the apparatus to close said contact.

7. A meter comprising a recorder including a moving record sheet and a marking device moving across said sheet, a column of liquid variable with the variations in the force to be measured, a contact movable into and out of said liquid column, means for moving said contact and said marking device in substantial synchronism, a circuit including an electro-magnet normally retracting said marking device, a relay circuit including the movable contact and the liquid column controlling the first mentioned circuit, an auxiliary circuit including a normally open contact controlling the relay circuit and means to close said open contact during the movement of the movable contact.

8. A meter comprising a recorder including a moving record sheet and a marking device moving across said sheet, a column of liquid variable with the variations in the force to be measured, a contact movable into and out of said liquid column, means for moving said contact and said marking device in substantial synchronism, a circuit including an electro-magnet normally retracting said marking device, a relay having an armature normally closing the magnet circuit, a circuit through the relay including the movable contact and the fluid column, and a branch circuit including a normally open contact to close the relay circuit, and means operated by a moving part of the apparatus to close said open contact.

9. A meter comprising a recorder including a rotating record sheet drum, a continuously reciprocating marking device coöperating with said drum, a magnet controlling said marking device, a circuit therefor, a relay controlling the magnet circuit, a circuit for said relay, and means operated in accordance with variations in the force to be measured to close the relay circuit.

10. A meter comprising a rotating record sheet drum, a reciprocating marking device coöperating with said drum, a magnet controlling said marking device, a circuit therefor, a relay controlling the magnet circuit, a circuit for said relay, a column of liquid variable with the variations in the force to be measured, a contact movable into and out of said liquid column and included with the liquid column in the relay circuit, auxiliary contacts within the relay circuit, and means for imparting the required movements to the marking device, the movable contact and the auxiliary contacts.

In testimony whereof I affix my signature, in presence of two witnesses.

PAUL LANHAM.

Witnesses:
ARTHUR L. BRYANT,
CHAS. J. O'NEILL.